United States Patent
Gregori et al.

(10) Patent No.: US 6,404,273 B1
(45) Date of Patent: Jun. 11, 2002

(54) VOLTAGE BOOSTER WITH A LOW OUTPUT RESISTANCE

(75) Inventors: Stefano Gregori, Torre D'Isola; Osama Khouri, Milan; Andrea Pierin, Graffignana; Rino Micheloni, Turate; Guido Torelli, Sant'Alessio con Vialone; Dario Soltesz, Gioia del Colle, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/785,083

(22) Filed: Feb. 13, 2001

(30) Foreign Application Priority Data

Oct. 26, 2000 (EP) ............................ 00830706

(51) Int. Cl.[7] ................................................ G05F 1/10
(52) U.S. Cl. ..................................................... 327/536
(58) Field of Search ............................... 327/530, 534, 327/535, 536, 537

(56) References Cited

U.S. PATENT DOCUMENTS 6,008,690 A * 12/1999 Takeshima et al. ......... 327/534
6,097,161 A * 8/2000 Takano et al. .............. 307/110
6,154,088 A * 11/2000 Chevallier et al. .......... 327/331
6,160,723 A * 12/2000 Liu ............................. 327/536
6,268,761 B1 * 7/2001 Naganawa ................... 327/536

* cited by examiner

Primary Examiner—Jeffrey Zweizig
(74) Attorney, Agent, or Firm—Lisa K. Jorgenson; David V. Carlson; SEED IP Law Group PLLC

(57) ABSTRACT

A charge pump voltage booster circuit for generating, from a first voltage supplied at the input to the circuit, an output voltage with an absolute value that is higher than the first voltage, comprises at least one stage having a charge pass element and a charge storage capacitor with a first plate connected to an output of the charge pass element and a second plate controlled by a square-wave control signal of period varying between a reference voltage and the first voltage, supplied to the second plate of the capacitor by means of a driver circuit comprising a pull-up transistor and a pull-down transistor connected in series between the first voltage and the reference voltage. Means of overdriving at least one of the said transistors, either the pull-up transistor or the pull-down transistor, supply to the said at least one transistor a firing control voltage that has a higher absolute value than the first voltage.

24 Claims, 5 Drawing Sheets

VOLTAGE BOOSTER WITH A LOW OUTPUT RESISTANCE

TECHNICAL FIELD

The present invention concerns so-called voltage booster circuits, in particular for use in integrated circuits such as semiconductor memories and especially non-volatile memories, for example Flash memories. More specifically, the invention concerns voltage booster circuits of the charge pump type.

BACKGROUND OF THE INVENTION

Over the last ten years, the progressive reduction in size of MOS transistors in monolithic integrated circuits has encouraged the use of ever lower supply voltages. In fact, the increase in integration density is based on the principle of reduction in scale ("scaling") with a constant electric field, owing to which it is possible to retain the functional characteristics of an MOS device while reducing all the dimensions by the same factor including those orthogonal to the surface of the integrated circuit (and therefore the thicknesses of the various layers, among these the gate oxides of the transistors), and the applied voltages, and increasing the doping concentrations of the active areas by the same factor.

At the present time, integrated circuits are available, in particular non-volatile semiconductor memories, that are able to operate with a supply voltage (VDD) nominally equal to 3 V or even lower.

Moreover, compared to normal MOS transistors used for example to construct logic gates, non-volatile memory cells, and in particular Flash memory cells, have special characteristics.

In fact, in Flash memory cells, the thickness of the gate oxide cannot be scaled down to below a certain value, typically 8 nm, in order to guarantee retention of the data stored in the cells for a sufficient period of time, typically 10 years.

In addition, the physical phenomena that permit programming and erasing of Flash memory cells only exist in the presence of high electric fields across the oxide.

For these reasons, at least during the operations of programming and erasing the cells, it is necessary to have voltages available that are higher, in absolute value, than the supply voltage currently used.

In non-volatile memories, in particular in multi-level Flash memories, it is therefore necessary to provide a voltage that is higher than the supply voltage currently used, not only for program and erase operations, but also for the operation of reading the contents of the memory cells.

Therefore, unless the required voltages are supplied to the integrated circuit from outside, they must be generated internally within the integrated circuit itself, this is typically the case for an integrated circuit with a single supply voltage (Single Power Supply). From this arises the requirement to provide voltage booster circuits on board the integrated circuit.

The most commonly used voltage booster circuits in integrated circuits are those based on the principle of the so-called charge pump, and for this reason they are called charge pump circuits or, more briefly, charge pumps. These circuits make available at their output a voltage with an absolute value that is higher than the voltage with which they are powered. In the field of charge pumps, a distinction can be made between positive charge pumps, that provide a positive voltage at their output, of the same polarity as the supply voltage, and negative charge pumps, that provide a negative voltage at their output, of opposite polarity to that of the supply voltage.

A problem that afflicts charge pumps is their limited capacity to supply an output current or, stating the problem differently, their high output resistance. In other words, charge pumps behave as poor voltage generators. That means that when the charge pump is required to deliver a large, sustained, or other significant current, the output voltage value drops drastically, in absolute value, with respect to the target value.

This aspect is especially critical for the use of charge pumps integrated with electrically programmable non-volatile memories such as, for example, Flash memories, in which charge pumps are used to generate bias voltages for the memory cells in order to perform the various operations which can be carried out on the memory. In particular, the generation of voltages to be applied to the drain of the memory cells during programming thereof becomes critical: in this case, the amount of current that the charge pump is able to deliver without the output voltage falling excessively below the target value places a limit on the number of cells that can be programmed in parallel.

Other critical aspects of charge pumps, although in some ways associated with the foregoing, are the recovery time, or the time required for the charge pump to restore the target voltage value output by the charge pump after the actual output voltage has fallen in absolute terms because of excessive current consumption, and the settling time for the voltage value at the output of the pump at the firing of the charge pump.

SUMMARY OF THE INVENTION

In view of the prior art described, one object of the present invention is therefore to provide a charge pump voltage booster circuit that is not affected by the problems mentioned, and in particular has a low output resistance.

In accordance with the present invention, this object is achieved by means of a charge pump voltage booster circuit as described in the independent claim 1 attached.

BRIEF DESCRIPTION OF THE DRAWINGS

The characteristics and advantages of the present invention will largely become clear from the following detailed description of some of its possible practical embodiments, provided purely as non-exhaustive examples in the associated drawings, in which.

DETAILED DESCRIPTION OF THE INVENTION

Figures 1, 4:
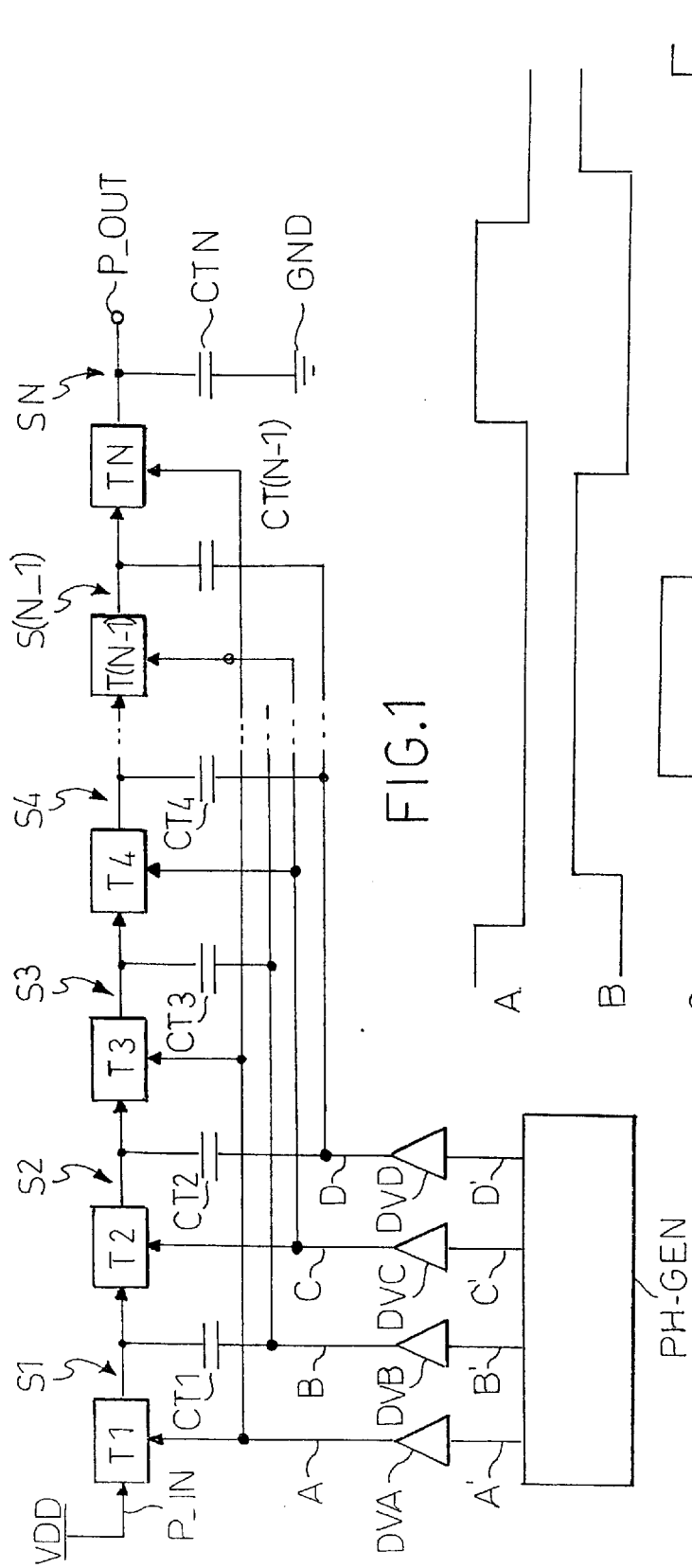
FIG. 1 shows schematically a charge pump voltage booster circuit, in particular a positive charge pump.
FIG. 4 is a timing diagram for the four control phases of the charge pump.

Referring to FIG. 1, this shows schematically a voltage booster circuit of the charge pump type, which for brevity will hereinafter be called a charge pump, that is suitable for incorporation into an integrated circuit, such as in particular a non-volatile semiconductor memory and, even more particularly, a Flash memory. In particular, the example shows a positive charge pump, that is to say one that is able to generate an output voltage of the same polarity but higher than the input voltage that powers the charge pump.

The charge pump includes several stages S1–SN, connected in series or cascade between an input node P_IN, and an output node P_OUT of the pump. At the input node P_IN, an input voltage VIN is supplied to the charge pump; in the example, the node P_IN is connected to a supply line of voltage VDD, that delivers a supply voltage into the integrated circuit in which the charge pump is incorporated, which supply voltage is supplied to the integrated circuit from outside. For example, the supply voltage VDD has a nominal value of 3 V.

Each stage S1–SN has an input node and an output node and includes a charge pass element T1–TN connected between the input and the output of the stage, and a charge storage element typically comprising a capacitor CT1–CT(N–1) with a first plate electrically connected to the output of the respective charge pass element and a second plate driven by a control signal B, C, etc., with the exception of the capacitor associated with the last stage SN of the charge pump, that has the second plate connected to a reference voltage or earth GND, that is also supplied to the integrated circuit from outside.

An intermediate stage S2–S(N–1) of the charge pump has its respective input electrically connected to the output of the preceding stage, and its output electrically connected to the input of the following stage. The first stage S1 of the charge pump has its input connected to the input node P_IN of the charge pump, while the last stage SN of the charge pump has its output connected to the output node P_OUT of the charge pump.

The charge pass element T1–TN can be a diode, possibly realized using a transistor connected in diode configuration. Preferably, in order to prevent the charge pass element causing voltage drops between its input and its output, the pass element is a pass transistor that, in the case of integrated circuits using MOS technology, is a MOSFET. In particular, in the example of a positive charge pump, an N-channel MOSFET can be used as a charge pass element, with a drain that acts as the input of the stage, a source that acts as the output of the stage and a gate driven by a control signal A or C.

Figure 2:
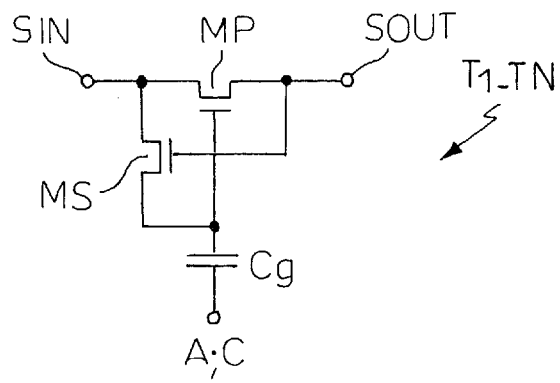
FIG. 2 shows a possible circuit solution for charge pass elements of the charge pump in FIG. 1.

A preferred, but non-limiting, embodiment of the pass element T1–TN is shown purely as an example in FIG. 2, in which MP represents an N-channel MOSFET functioning as a pass transistor with a drain that acts as the input SIN and a source that acts as the output SOUT of the stage to which it belongs. The gate of the MOSFET MP is connected to a first plate of a gate capacitor Cg, whose second plate is connected to the control signal A or C. A second MOSFET MS is also provided that functions as a charge element of the gate capacitor Cg and has its drain connected to the input SIN of the stage, its source connected to the first plate of the gate capacitor Cg and its gate connected to the output of the stage SOUT.

The pass elements T1–TN of the various stages may all be of the same type, or else some may be diodes and others pass transistors.

Returning to FIG. 1, associated with the charge pump is a circuit $PH_{13}$ GEN that generates phase signals A', B', C', D' comprising suitably phase-shifted periodic square-wave signals with the appropriate duty cycle. The phase signals A', B', C', D' are supplied at the input of the respective driver stages DVA, DVB, DVC, DVD that generate the control signals A, B, C, D or phases, to drive the charge pass elements T1–TN and the storage capacitors CT1–CTN.

The timing diagram in FIG. 4 shows the four phases A, B, C and D: these are four periodic square-wave signals, of equal period T, variable between a first voltage level, corresponding to the reference voltage GND, and a second voltage level corresponding to the supply voltage VDD. The four phases A, B, C and D are suitably mutually phase-shifted, in particular phase C is shifted by one half cycle with respect to phase A and phase D is shifted by one half cycle with respect to phase B. In addition, the four phases A, B, C and D have a suitable duty cycle, differing from 50%: in particular, phases A and C have a duty cycle of lower than 50% while phases B and D have a duty cycle of higher than 50%, and phases B and D are substantially in quadrature to phases A and C respectively.

Figure 3:
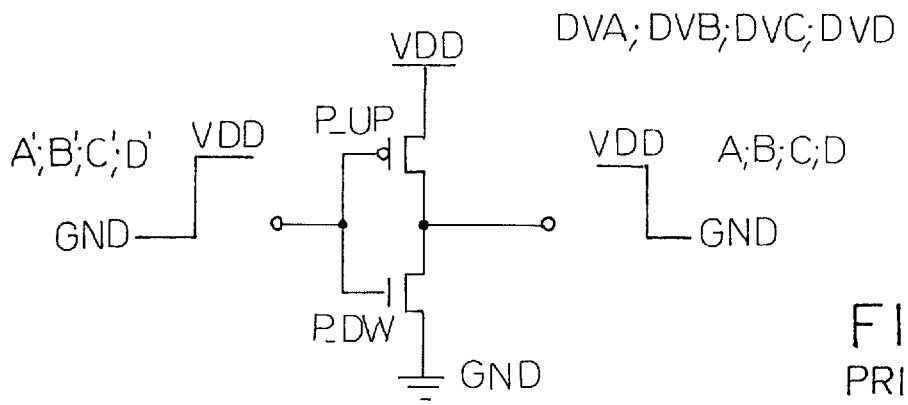
FIG. 3 shows the circuit structure of final driver circuits, or drivers, that generate control phases of the charge pump in FIG. 1, produced in accordance with the prior art.

FIG. 3 shows the structure of a generic driver DVA, DVB, DVC, DVD in accordance with the prior art. The driver consists essentially of a CMOS inverter stage with a P-channel pull-up MOSFET P_UP and an N-channel MOSFET P_DW (pull-down) connected in series between the supply voltage VDD and the reference voltage GND (earth), controlled by one of the four signals A', B', C', D' generated by the phase generator circuit PH_GEN. The output of the inverter consists of one of the four phases A, B, C, D.

The four signals A, B, C, D, which are the logical complement of phases A, B, C and D respectively, are therefore periodic square-wave signals of period T, and these too, like the phases A, B, C, D, vary between a first voltage level corresponding to the reference voltage GND and a second voltage level corresponding to the supply voltage VDD. In other words, the excursion of the generic signal of the four signals A', B', C' and D' is equal to the supply voltage VDD.

Figure 5:
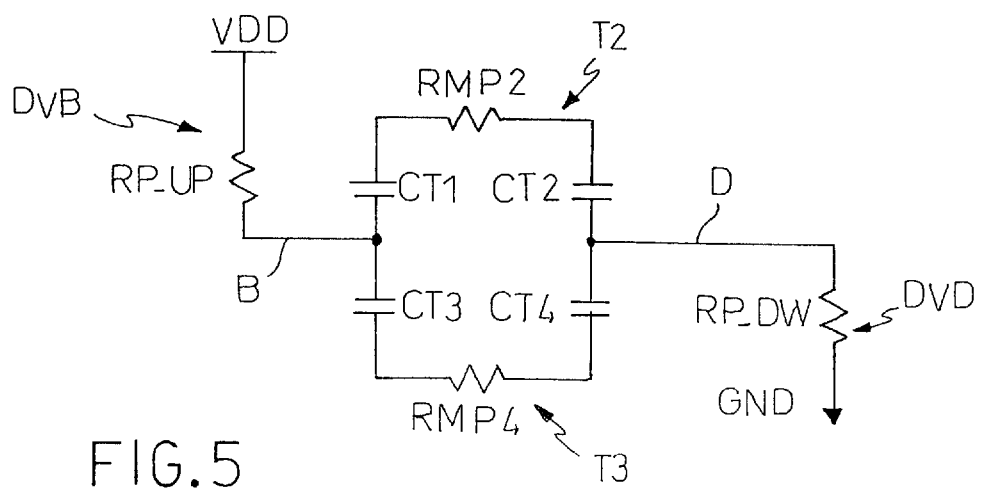
FIG. 5 is an equivalent electrical circuit that illustrates the route of the charge in the charge pump.

Reference is now made to FIG. 5: this shows an electrical circuit that is equivalent to the part of the charge pump that includes the storage capacitor CT1 and the three stages S2, S3 and S4, in the time interval Δt of a generic operating cycle in which phase B is active (voltage level corresponding to the supply voltage VDD) and simultaneously phase D is inactive (voltage level corresponding to the reference voltage GND. In driver DVB, the pull-up P_UP will therefore be activated while in driver DVD the pull-down P_DW will be activated. RP_UP and RP_DW are resistors that are equivalent in circuit terms to the parasitic resistances (firing resistances) of the pull-up P_UP of driver DVB and of the pull-down P_DW of driver DVD respectively. RMP2 and RMP4 refer to resistors that are equivalent in circuit terms to the parasitic resistances (firing resistances) of the pass transistors MP of the pass element T2 and of the pass element T4 respectively. The equivalent circuit in FIG. 5 therefore shows, even though neglecting the effects introduced by the last stages of the charge pump, the path that the current, and therefore the charge, follows in passing from the pair of storage capacitors CT1 and CT3, driven by phase B, to the capacitor CT2 and the capacitor CT4 respectively, the latter two capacitors being driven by phase D.

As can be seen from FIG. 5, the current follows two parallel paths in flowing from the supply voltage VDD to the reference voltage GND: a first path includes the capacitors CT1 and CT2 and the resistor RMP2; a second path includes the capacitors CT3 and CT4 and the resistor RMP4.

The time constant of the circuit in FIG. 5 is therefore:

$$\tau = (RP\_UP + RP\_DW + RMP/2) * CT$$

where RMP is the value of the resistance of each of the resistors RMP4 and RMP2, which are assumed to be equal, and CT is the value of the capacitance of the capacitors CT1, CT2, CT3, CT4, which are also assumed to be equal.

The value of the time constant τ is indicative of the time necessary for the charge stored in a generic storage capacitor in a stage S1–S(N−1) of the charge pump to be transferred in full to the storage capacitor of the next stage. The value of the time constant τ is therefore a determinant for the purpose of establishing the period T of phases A, B, C, D, that is to say for establishing the frequency f at which the pump can operate. As is known, the output resistance ROUT of the charge pump is approximately given by the relation:

$$ROUT = N/(f * CT)$$

where N is the number of stages of the charge pump, CT is the capacitance of the storage capacitor associated with the stage (assuming that all the capacitors C1–CN have the same capacitance), and f is the phase frequency.

An objective of primary importance in the design of a charge pump is to reduce its output resistance ROUT; that implies the possibility of operating at a high frequency f. Therefore it is necessary that the time constant τ should be small. For this purpose, a reduction in the value of the capacitor CT is not a possible solution, since that would cause an increase in the output resistance ROUT.

In order to reduce the time constant τ it is therefore necessary to attempt to reduce the value of the parasitic resistances (firing resistances) of the MOSFETs.

In particular, the Applicant has found that for the purpose of reducing the value of the time constant τ it is advantageous to reduce the parasitic firing resistances of the P_UP and P_DW MOSFETs, that is to say of the pull-ups and pull-downs of drivers DVB, DVD that generate phases B and D that control the charge storage capacitors. By reducing the resistances RP_UP and RP_DW, the time required for the transfer of the charge from the storage capacitor of a generic stage to that of the next stage is reduced, therefore it is possible to increase the operating frequency f of the charge pump and consequently to reduce the output resistance ROUT of the pump.

By observing that the approximate expression for the firing resistance of a MOSFET operating in the triode zone is:

$$R = 1/(k'*(W/L)*|VGS-VTH|)$$

where k' is a constant that depends on the gate oxide thickness and on the mobility of the charge carriers, W and L are the width and length respectively of the MOSFET channel, VTH is the threshold voltage of the MOSFET, it can be seen that, with k' and VTH being parameters associated with the manufacturing process of the integrated circuit on which the circuit designer has no influence, the parameters that can be altered by the designer are the ratio W/L and the gate-source voltage VGS, or the drive voltage of the MOSFET.

As concerns the ratio W/L, increasing this ratio reduces the resistance of the channel but, assuming that a channel length L equal to the minimum permitted by the manufacturing process is always adopted, increases the area of the gate and therefore increases the parasitic capacitance of the gate, increases the parasitic capacitance between the drain or source diffusions and earth, and increases the area occupied by the MOSFET.

Therefore, the present invention envisages working on the value of the voltage VGS, or on the value of the drive voltage of the MOSFETs that constitute the pull-up P_UP and pull-down P_DW of drivers DVB, DVD that drive the plates of the storage capacitors CT1–CT(N−1).

Figure 6:
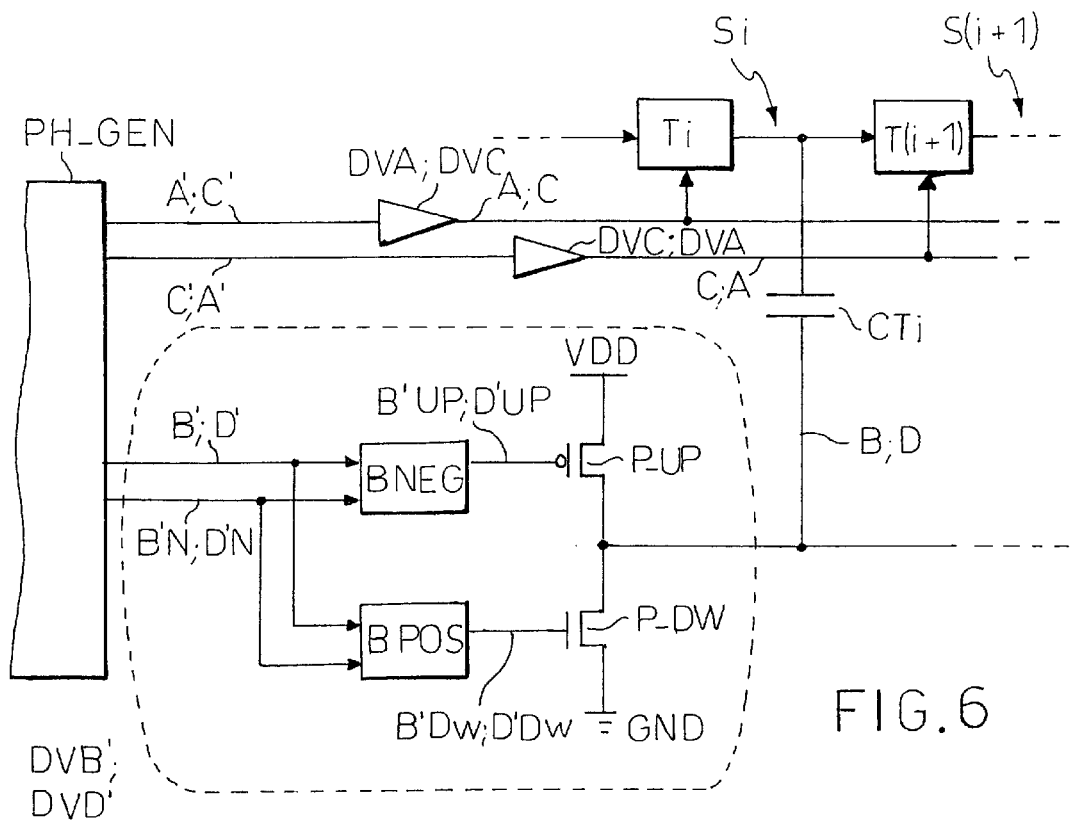
FIG. 6 shows in a simplified, schematic form a charge pump with a control phase generator driver for the charge pump in accordance with a first embodiment of the present invention.

FIG. 6 shows, in a simplified and schematic manner, a first possible practical embodiment of the present invention. In particular, two stages Si, S(i+1) of the charge pump in FIG. 1 are shown schematically. The pass elements Ti, T(i+1) of the two stages Si, S(i+1), for example of a similar structure to that shown in FIG. 2, receive from the phase generator circuit PH_GEN, through drivers DVA, DVC, the control signals or phases A and C, shown in FIG. 4, that can vary between the reference voltage or earth GND and the supply voltage VDD.

To drive the storage capacitors CTi, drivers DVB' and DVD' are provided including a CMOS inverter formed from a pair of MOSFETs P_UP, P_DW, a P-channel and an N-channel MOSFET respectively, connected in series between the supply voltage VDD and the reference voltage or earth GND. The MOSFET P_UP, the pull-up of the inverter, is driven by a first signal B'UP, D'UP while the MOSFET P_DW, the pull-down of the inverter, is driven by a second signal B'DW, D'DW.

Figure 7:
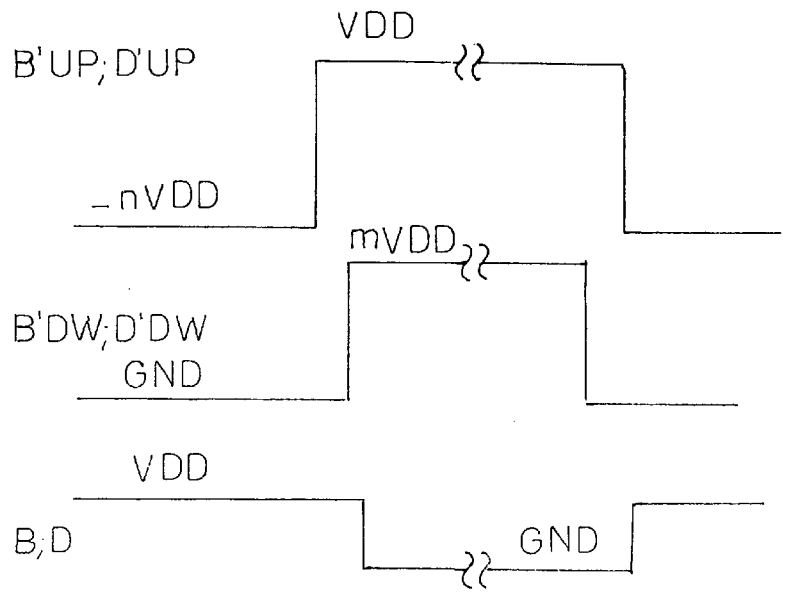
FIG. 7 is a timing diagram showing control signals for the driver in FIG. 6.

FIG. 7 shows a timing diagram of the first signal B'UP, D'UP, of the second signal B'DW, D'DW and of the phases B, D output by the driver DVB', DVD' that drives the second plate of the capacitor CTi.

As can be seen from FIG. 7, the first signal B'UP, D'UP, that drives the pull-up P_UP of the inverter, is a square-wave signal that can vary between a negative voltage level −nVDD, where n≧1, and a positive voltage level, equal to the supply voltage VDD. In other words, while in accordance with the prior art (FIG. 3) the signal B', D' that drives the pull-up of the inverter varies between the reference voltage or earth GND and the supply voltage VDD, in accordance with the present invention on the other hand, the signal B'UP, D'UP that drives the pull-up of the inverter varies between a negative voltage, in particular lower than, or at most equal to, the opposite of the supply voltage VDD, and the supply voltage VDD itself. That is to say the dynamics or excursion of the signal that drives the pull-up of the inverter are increased, and in particular the dynamics are increased, permitting the signal to fall below the reference voltage or earth GND. This results in overdriving the MOSFET P_UP, that is to say in an increase (in absolute value) of the firing control voltage VGS applied to this MOSFET to initiate its firing, and therefore in a reduction of the firing resistance (RP_UP in FIG. 5) of the MOSFET P_UP.

In a similar manner, the signal B'DW, D'DW that drives the MOSFET P_DW, the pull-down of the inverter, is a square-wave signal varying between the reference voltage or earth GND and a positive voltage level mVDD, where m>1. In other words, while in accordance with the prior art (FIG. 3) the signal B', D' that drives the pull-down of the inverter varies between the reference voltage or earth GND and the supply voltage VDD, in accordance with the present invention the signal B'DW, D'DW that drives the pull-down of the inverter varies instead between the reference voltage or earth GND and a positive voltage that is higher than the supply voltage VDD. That is to say the dynamics or excursion of the signal that drives the pull-down of the inverter are increased, and in particular the dynamics are increased, permitting the signal to rise above the supply voltage VDD. This results in overdriving the MOSFET P_DW, or in an increase (in absolute value) of the firing control voltage VGS applied to this MOSFET to initiate its firing, and therefore in a reduction of the firing resistance (RP_DW in FIG. 5) of the MOSFET P_DW.

Preferably, as shown in FIG. 7, the first signal B'UP, D'UP that drives the pull-up MOSFET P_UP, and the second signal B'DW, D'DW that drives the pull-down MOSFET P_DW are conveniently not superimposed in time: the transition of the signal B'DW, D'DW from the voltage level GND to the voltage level mVDD, that controls the firing of the pull-down P_DW of the inverter, is slightly delayed with respect to the transition of the signal B'UP, D'UP from the voltage level −nVDD to the voltage level VDD, that controls the cut-off of the pull-up P_UP; in a similar manner, the transition of the signal B'UP, D'UP from the voltage level VDD to the voltage level −nVDD, that controls the referring of the pull-up P_UP, is slightly delayed with respect to the transition of the signal B'DW, D'DW from the voltage level mVDD to the voltage level GND, that controls the cut-off of the pull-down P_DW. In this manner, the two MOSFETs P_UP and P_DW are virtually never fired at the same time and the (so-called "crowbar") current flowing from the voltage VDD to voltage GND is significantly reduced.

Returning to FIG. 6, the signal B'UP, D'UP and the signal B'DW, D'DW are generated, from a signal B', D', that is similar to the signal B', D' in FIG. 1 and therefore can vary between the reference voltage GND and the supply voltage VDD, and from a signal B'N, D'N that is substantially the logical complement of the signal B', D', assumed to be generated by the phase generator circuit PH_GEN, by means of a pair of boost circuits BNEG and BPOS, the first of which is able to generate the negative voltage −nVDD, and the second of which is able to generate the positive voltage mVDD>VDD.

Figure 8:
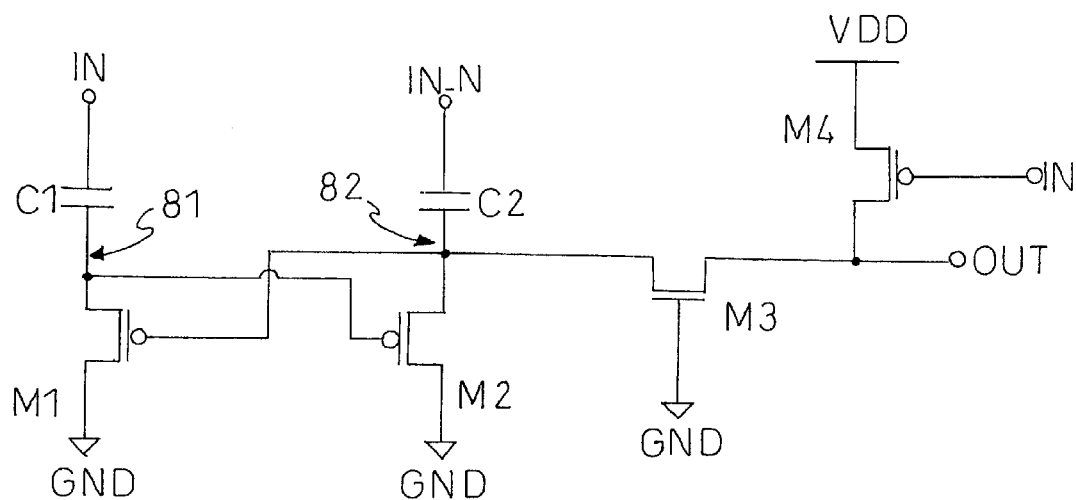
FIG. 8 shows a possible circuit implementation of a circuit for generating the control signal of the pull-up transistor of the driver in FIG. 6.
Figure 9:
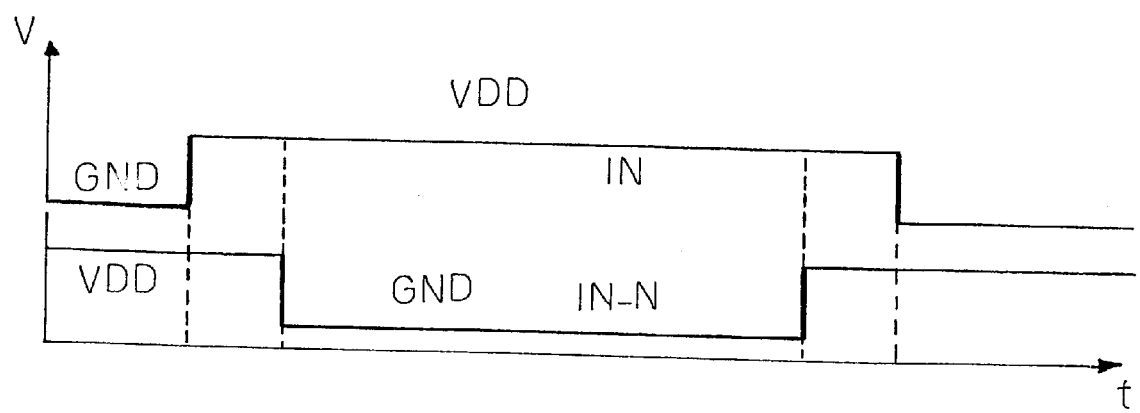
FIG. 9 is a timing diagram showing control signals of the circuit in FIG. 8.

FIG. 8 shows, purely as an example, a possible circuit diagram of the circuit BNEG in FIG. 6. The circuit includes two circuit branches 81, 82, each including a P-channel MOSFET M1, M2 with its source connected to the reference voltage GND and its drain connected to a first plate of a respective capacitor C1, C2, whose second plate is driven by a digital signal IN or by its logical complement IN_N respectively; the signals IN and IN_N, shown in the timing diagram in FIG. 9, are for example the signals B' and B'N, or the signals D' and D'N in FIG. 6. The two circuit branches 81, 82 are interconnected together, in the sense that the MOSFET M1 has its gate connected to the drain of the MOSFET M2 and vice versa. Also connected to the drain of the MOSFET M2 is the source of an N-channel MOSFET M3, whose gate is connected to the reference voltage GND and whose drain is connected to the drain of a P-channel MOSFET M4 whose source is at the supply voltage VDD and whose gate is driven by the signal IN. The drain of the MOSFET M4 forms the output OUT of the circuit, which can correspond to the signal B'UP or to the signal D'UP in FIG. 6.

In order to understand the operation of the circuit in FIG. 8, with reference to the timing diagram in FIG. 9, it can be seen that this circuit, too, operates on the basis of the charge pump principle, and in particular when the signal IN is at the reference voltage level GND, the MOSFET M4 is fired and brings the output OUT to the level of the supply voltage VDD. The two branches 81, 82 are used to generate, on with the drain of the MOSFET M2, a voltage with a value substantially equal to −VDD, that can be transferred to the output OUT via the MOSFET M3 when the signal IN rises to the level of the supply voltage VDD, cutting off the MOSFET M4. In particular, the circuit branch 81 is used to generate a voltage that is lower than the reference voltage GND in order to overdrive the MOSFET M2.

A similar type circuit to that shown in FIG. 9 for the BNEG can be provided for the BPOS of FIG. 6, as will be recognized by those of skill in the art. There are a large number of acceptable circuits that can be provided for either BNEG or POS and those of skill in the art can easily construct such a circuit from the published sources thereof or provide equivalents.

Owing to the present invention, the driver that generates the control phases B, D of the charge storage capacitors offers low driving resistances both to the supply voltage VDD and to the reference voltage or earth GND. Therefore, with the capacitances CT of the storage capacitors being equal, it is possible to increase the operating frequency f, and thus to reduce the period T of the phases, thereby reducing the output resistance ROUT of the charge pump. The increase in the operating frequency f of the phases enables a charge pump to be obtained that is able to deliver more current for the same area occupied (substantially the whole area of the storage capacitors); alternatively, it is possible to reduce the area occupied by the charge pump without reducing the maximum deliverable current.

In addition, it being possible to reduce the output resistance ROUT, the charge pump will have a reduced recovery time. Namely the time required to restore the voltage value at the output node P_OUT after a drop in value due to a high current consumption will be lower. It will also be easier to maintain the proper voltage at the output when the current demand becomes high.

In a similar way, the settling time for firing of the charge pump will also be reduced.

In the above description, both the pull-up MOSFET P_UP and the pull-down MOSFET P_DW of the final inverter that drives the pass capacitors CT1–CT(N−1) of the charge pump are overdriven, or are controlled by the respective signals B'UP, D'UP and B'DW, D'DW, so that, in the first case, a voltage level −nVDD that is lower than the reference voltage GND can be assumed, while in the second case, a voltage level mVDD that is higher than the supply voltage VDD can be assumed. In this way, it is possible to reduce both the firing resistance RP_UP of the pull-up of the final inverter and the firing resistance RP_DW of the pull-down MOSFET driving both the pull-up and pull-down transistors is one embodiment of the present invention that is especially advantageous in terms of the performance of the charge pump, butother embodiments may also be implemented. According to one embodiment, only the pull-up MOSFET is overdriven, leaving the pull-down MOSFET to be driven by a signal that can vary between the reference voltage GND and the supply voltage VDD. Alternatively, in another embodiment, only the pull-down MOSFET is overdriven, leaving the pull-up MOSFET to be driven by a signal varying between the supply voltage VDD and the reference voltage GND.

In general terms therefore, the present invention provides that at least one of the pull-up MOSFET P_UP and pull-down MOSFET P_DW of at least one of the drivers DVB, DVD that drive the charge storage capacitors CT1–CT(N−1) are overdriven in such a manner that their firing resistance is lower than it would be if this MOSFET were driven by a signal varying between the supply voltage VDD and the reference voltage GND.

Figure 10:
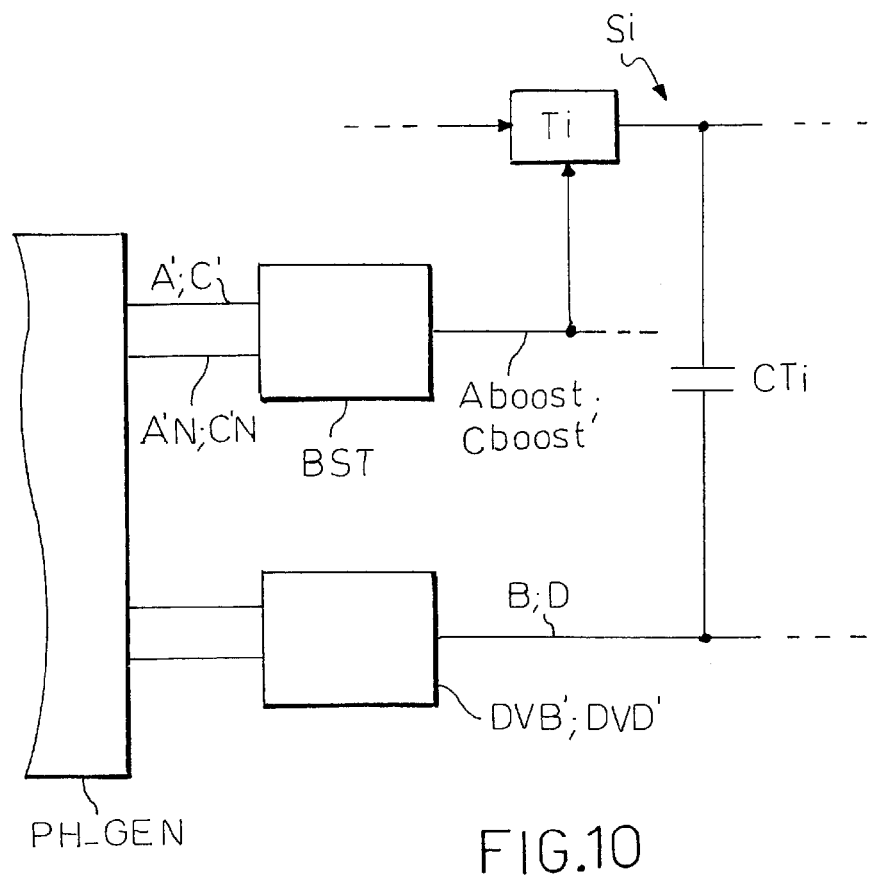
FIG. 10 shows schematically a charge pump with control phase generator driver for the charge pump in accordance with a second embodiment of the invention.

FIG. 10 shows schematically and in a simplified manner a further possible embodiment of the present invention. In addition to overdriving the pull-up and pull-down MOSFETs of the drivers DVB', DVD' that drive the charge storage capacitors CT1–CT(N−1), in this embodiment provision is also made, in order to drive the pass elements T1–TN of stages S1–SN of the pump, for the generation of boosted signals Aboost, Cboost from signals A', C' and from signals A'N, C'N, which are substantially their logical complement, by means of a boost circuit BST. Assuming, for example, that the generic pass element Ti of stage Si is produced in accordance with that shown in FIG. 2, by overdriving the MOSFET MP a reduction in the firing resistances RMP2 and RMP4 shown in FIG. 5 is obtained, with this contributing to the reduction in the time constant τ and thus making a further increase in the operating frequency f of the charge pump possible.

Figure 11:
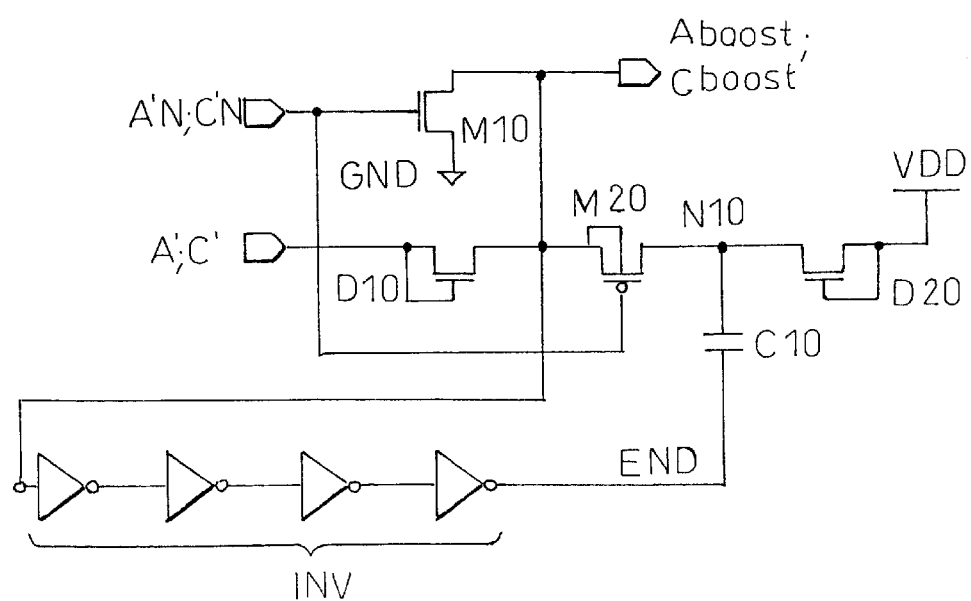
FIG. 11 shows a possible circuit implementation of a circuit for generating the control phases of the charge pass elements of the charge pump in FIG. 10.

FIG. 11 shows, by way of example, a possible practical implementation of the boost circuit BST. The circuit includes an N-channel MOSFET M10 with its source connected to the reference voltage GND, its gate controlled by the signal A'N, C'N and from whose drain the boosted output signal Aboost, Cboost is taken. The circuit also includes an N-channel MOSFET D10 in diode configuration with its gate and drain controlled by the signal A', C'; to the source of the MOSFET D10, which is electrically connected to the output node Aboost, Cboost of the circuit, is connected the drain of a P-channel MOSFET M20, controlled by the signal A'N, C'N, to whose source is connected a first plate of a capacitor C10 and also the source of an N-channel MOSFET D20 that is also in diode configuration, with its gate and drain connected to the supply voltage VDD. The second plate of the capacitor C10 is controlled by an output END from a chain of four (or, in general, an even number) of inverters INV, whose input is connected to the output node Aboost, Cboost of the circuit.

The operation of the circuit in FIG. 11 is as follows:

When the signal A', C' passes from the reference voltage GND to the supply voltage VDD, through the MOSFET D10, the output node Aboost, Cboost is raised to the voltage VDD−VTH(D10), where VTH(D10) represents the threshold voltage of MOSFET D10. At the same time the MOSFET M20 fires, ensuring a sufficiently low rise time of the signal on the output node Aboost, Cboost. In fact, through the MOSFET D20 that connects the MOSFET M20 to the supply voltage VDD, a current is supplied to the gate capacitor Cg (FIG. 2) of the pass transistor of the pass element Ti, which is thus charged through two parallel paths. In the meantime, the signal sampled on the output node propagates through the chain of inverters INV; the chain of inverters INV introduces a convenient propagation delay. When, after the desired delay, the signal END also switches from the voltage level GND to the voltage level VDD, the voltage level on the node N10, and consequently that on the output node of the circuit, is raised by a value corresponding to the supply voltage VDD. In this manner, the pass transistor MP of the pass element Ti is overdriven, and its firing resistance is reduced.

When the signal A'N, C'N passes from the voltage level GND to the voltage level VDD, the MOSFET M10 is fired, short circuiting the output node Aboost, Cboost of the circuit to the reference voltage; the voltage on the node Aboost, Cboost, and therefore on the gate of the pass transistor, rises by a value approximately equal to 2VDD−VTH(M10), where VTH(M10) is the threshold voltage of the MOSFET M10. At the same time, MOSFET M20 cuts off, isolating the node N10 from the output node of the circuit, thereby preventing the capacitor C10 from discharging towards the reference voltage through the MOSFET M10. The capacitor C10 however remains charged, avoiding the necessity of recharging it during the subsequent half cycle. With the delay introduced by the chain of inverters INV, the signal END is also brought to the voltage level GND, in this manner causing the voltage on the node N10 to be reduced by an amount corresponding to the supply voltage VDD. In this manner, the capacitor C10, which in the previous half cycle was partially discharged due to the inevitable loss currents and phenomena due to sharing the charge with parasitic capacitances, is able to recharge itself to the voltage VDD−VTH(D2), through the MOSFET D20.

It is clear that the person skilled in the art could easily modify or make additions to what has been described and illustrated above, without however departing from the scope of protection of the present invention defined in the attached claims.

What is claimed is:

1. A charge pump voltage booster circuit for generating, from a first voltage supplied at the input to the circuit, an output voltage with an absolute value that is higher than the first voltage, comprising:
 a first stage having a charge pass element and a charge storage capacitor with a first plate connected to an output of the charge pass element and a second plate controlled by a square-wave control signal of period varying between a reference voltage and the first voltage; supplied to the second plate of the capacitor by means of
 a driver circuit comprising a pull-up transistor and a pull-down transistor connected in series between the first voltage and the reference voltage to output the square-wave control signal,
 means of overdriving at least one transistor of the said pull-up transistor and pull-down transistor, in order to supply to said at least one transistor a firing control voltage that has a higher absolute value than the first voltage.

2. The circuit according to claim 1, in which said at least one transistor of the final driver circuit is the pull-up transistor, said overdriving means supplying to the pull-up transistor a driver signal varying between the first voltage and a third voltage of opposite polarity to the first voltage, in such a manner that the firing control voltage of the pull-up transistor is made equal to the difference between the third voltage and the first voltage, and has a higher absolute value than the first voltage.

3. The circuit according to claim 2, in which said third voltage is, in absolute value, equal to or higher than the first voltage, so that the firing control voltage of the pull-up transistor is, in absolute value, equal to or higher than twice the first voltage.

4. The circuit according to claim 1, in which said at least one transistor of the final driver circuit is the pull-down transistor, said overdriving means supplying to the pull-down transistor a driver signal varying between the reference voltage and a fourth voltage of the same polarity as and of a higher value than the first voltage, in such a manner that the firing control voltage of the pull-down transistor is made equal to the fourth voltage, and is higher than the first voltage.

5. The circuit according to claim 1, in which both the pull-up transistor and the pull-down transistor of the final driver circuit are overdriven, said means of overdriving comprising:

first means of overdriving the pull-up transistor;

second means of overdriving the pull-down transistor; and the first means of overdriving supplying to the pull-up transistor a driver signal varying between the first voltage and a third voltage of opposite polarity to the first voltage, the second means of overdriving supplying to the pull-down transistor a driver signal varying between the reference voltage and a fourth voltage of the same polarity as and of a higher value than the first voltage.

6. The circuit according to claim 5, in which the said third voltage is, in absolute value, equal to or higher than the first voltage.

7. The circuit according to claim 5 or 6, in which the overdrive signal of the pull-down transistor is temporally not superimposed on the overdrive signal of the pull-up transistor, in such a manner that the firing of the pull-down transistor always follows the cut-off of the pull-up transistor and the cut-off of the pull-down transistor always precedes the firing of the pull-up transistor.

8. The circuit according to claim 1, in which the said first voltage and the said reference voltage are a supply voltage and a reference voltage respectively of an integrated circuit in which the voltage booster circuit is incorporated.

9. The circuit according to claim 1, in which the pass element of the first stage includes a pass transistor, controlled by its own charge transfer control signal.

10. The circuit according to claim 9, in which the said control signal of the pass transistor is generated by a booster circuit, in such a manner as to supply to the pass transistor a drive voltage with a value that is higher than the first voltage.

11. The circuit according to claim 1, for generating an output voltage of the same polarity as the first voltage and of a higher value.

12. The circuit according to claim 1, for generating an output voltage of opposite polarity with respect to the first voltage.

13. An integrated circuit comprising:

a first voltage supply line;

a second voltage supply line;

a first stage being coupled to the first voltage supply line;

a charge pass circuit within said first stage, said charge pass circuit having a first input connected to the first voltage supply line and a second input connected to an enable terminal and having an output terminal;

a capacitor within the first stage, the capacitor having a first plate coupled to the output of the charge pass element and having a second plate;

a driver circuit coupled to the second plate of the capacitor, the driver circuit having a pull-up transistor and a pull-down transistor; and an enable circuit coupled to the drive circuit and outputting and enable voltage, the enable voltage having a value which is greater than a voltage on the first supply line.

14. An integrated circuit comprising:

a first voltage supply line;

a second voltage supply line;

a first stage being coupled to the first voltage supply line;

a charge pass circuit within said first stage, said charge pass circuit having a first input connected to the first voltage supply line and a second input connected to an enable terminal and having an output terminal;

a capacitor within the first stage, the capacitor having a first plate coupled to the output of the charge pass element and having a second plate;

a driver circuit coupled to the second plate of the capacitor, the driver circuit having a pull-up transistor and a pull-down transistor; and having a value which is less than the value of a voltage on the second supply line.

15. The circuit according to any one of claims 13 or 14, in which the first supply line is held at VDD.

16. The circuit according to either one of claims 13 or 14, in which the second supply line is ground.

17. The circuit to either one of claims 13 or 14, further including:

a non-volatile memory array formed on the integrated circuit; and an output of the charge pump circuit being provided to the non-volatile memory array.

18. The circuit according to claim 13, further including:

a second stage in the booster circuit, the second stage having a charge pass element and a capacitor, the charge pass element having an enable terminal and an output terminal, the capacitor of the second stage being coupled to the output terminal of the pass element of the second stage; and a drive circuit coupled to a second plate of the capacitor of the second charge circuit.

19. The circuit according to claim 13, further including a voltage boost circuit coupled to the enable terminal of the charge pass transistor.

20. An integrated circuit comprising:

a first voltage supply line;

a second voltage supply line;

a first stage being coupled to the first voltage supply line;

a charge pass circuit within said first stage, said charge pass circuit having a first input connected to the first voltage supply line and a second input connected to an enable terminal and having an output terminal;

a capacitor within the first stage, the capacitor having a first plate coupled to the output of the charge pass element and having a second plate;

a driver circuit coupled to the second plate of the capacitor, the driver circuit having a pull-up transistor and a pull-down transistor; and an enable circuit coupled to the drive circuit and outputting and enable voltage, the enable voltage having a value which is greater than a voltage on the first supply line and having a value which is less than the value of a voltage on the second supply line.

21. A method of providing a boosted voltage comprising:

inputting a voltage supply to a first stage of a voltage booster circuit;

storing charge on a capacitor in the first stage;

driving a plate of the capacitor of the first stage from a first voltage level to a second voltage level using a drive circuit;

the drive circuit having at least one MOS transistor therein having a gate, a source, and a drain; and driving the gate of the at least one MOS transistor to a voltage of a greater absolute value than that of the source or the drain when changing the voltage on the plate of the capacitor from a first voltage to a second voltage.

22. The method according to claim 21, further including:

providing a drive circuit having a second MOS transistor, the second MOS transistor being of the opposite conductivity type from the first MOS transistor; and driving the second MOS transistor with a voltage which is greater in absolute value than the voltage on either its source or its drain.

23. The method according to claim 22, further including:

disabling the first MOS transistor prior to driving the gate of the second MOS transistor to the absolute value greater than either its source or its drain; and disabling the second MOS transistor prior to driving its gate to an absolute value greater than its source or its drain.

24. The method according to claim 21, further including boosting the voltage on the enable terminal of the pass element.

* * * * *